United States Patent
Zimmer et al.

(10) Patent No.: US 10,751,969 B2
(45) Date of Patent: Aug. 25, 2020

(54) INTERNAL TUBE FOR TANKS, PARTICULARLY FUEL TANKS OF AUTOMOBILES

(71) Applicant: TI AUTOMOTIVE (FULDABRÜCK) GMBH, Fuldabrück (DE)

(72) Inventors: Werner Zimmer, Meisungen/Röhrenfurth (DE); Frank Fahrenholz, Kassel (DE); Matthias Baumann, Duisburg (DE)

(73) Assignee: TI AUTOMOTIVE (FULDABRÜCK) GMBH, Fuldabrück (DE)

( * ) Notice: Subject to any disclaimer, the term of this patent is extended or adjusted under 35 U.S.C. 154(b) by 141 days.

(21) Appl. No.: 15/956,288

(22) Filed: Apr. 18, 2018

(65) Prior Publication Data

US 2018/0304596 A1   Oct. 25, 2018

(30) Foreign Application Priority Data

Apr. 19, 2017  (EP) .................................... 17167129

(51) Int. Cl.
*B32B 1/08* (2006.01)
*F16L 11/04* (2006.01)
(Continued)

(52) U.S. Cl.
CPC ................. *B32B 1/08* (2013.01); *B32B 3/28* (2013.01); *B32B 7/12* (2013.01); *B32B 27/08* (2013.01); *B32B 27/18* (2013.01); *B32B 27/32* (2013.01); *B32B 27/327* (2013.01); *B32B 27/34* (2013.01); *B32B 27/36* (2013.01); *B60K 15/01* (2013.01); *B60K 15/03* (2013.01); *F16L 11/04* (2013.01); *F16L 11/10* (2013.01); *F16L 11/11* (2013.01); *F16L 11/1185* (2013.01);
*B32B 2250/03* (2013.01); *B32B 2250/05* (2013.01); *B32B 2250/24* (2013.01); *B32B 2250/40* (2013.01);
(Continued)

(58) Field of Classification Search
CPC . B32B 1/08; B32B 27/32; B32B 27/36; F16L 11/04; F16L 11/10; F16L 11/11; F16L 11/1185
See application file for complete search history.

(56) References Cited

U.S. PATENT DOCUMENTS 6,592,955 B1 *  7/2003  Dupont ................... B29C 49/22
                                                                428/35.7
2002/0098305 A1   7/2002  Van Schaftingen et al.
(Continued)

FOREIGN PATENT DOCUMENTS

CA   2 509 518 A1   12/2005
DE   199 12 438 A1   9/1999

OTHER PUBLICATIONS

International Search Report, International Serial No. 17167129.0, dated Jul. 20, 2017, 8 pgs.

*Primary Examiner* — Walter Aughenbaugh
(74) *Attorney, Agent, or Firm* — Dickinson Wright PLLC

(57) ABSTRACT

An internal tube for tanks, particularly fuel tanks of automobiles, wherein the tube has a fluid channel and a tube wall that encloses the fluid channel, wherein the tube wall has a multilayer design and is composed of at least three layers, with one inner layer based on at least one polyolefin being provided, with at least one central layer based on at least one polyamide being present, and with one outer layer based on at least one polyolefin being provided.

24 Claims, 2 Drawing Sheets

(51) Int. Cl.

| | | |
|---|---|---|
| *B32B 27/08* | (2006.01) | |
| *B32B 27/32* | (2006.01) | |
| *B32B 27/34* | (2006.01) | |
| *B60K 15/01* | (2006.01) | |
| *B32B 3/28* | (2006.01) | |
| *B32B 7/12* | (2006.01) | |
| *B32B 27/18* | (2006.01) | |
| *B60K 15/03* | (2006.01) | |
| *F16L 11/10* | (2006.01) | |
| *B32B 27/36* | (2006.01) | |
| *F16L 11/11* | (2006.01) | |
| *F16L 11/118* | (2006.01) | |

(52) U.S. Cl.
CPC ..... *B32B 2264/108* (2013.01); *B32B 2270/00* (2013.01); *B32B 2307/202* (2013.01); *B32B 2307/302* (2013.01); *B32B 2307/732* (2013.01); *B32B 2309/105* (2013.01); *B32B 2323/043* (2013.01); *B32B 2377/00* (2013.01); *B32B 2597/00* (2013.01); *B32B 2605/00* (2013.01); *B60K 2015/03493* (2013.01)

(56) References Cited

U.S. PATENT DOCUMENTS

| | | | |
|---|---|---|---|
| 2005/0058845 A1* | 3/2005 | Bellet | B32B 27/08 428/476.3 |
| 2007/0134458 A1 | 6/2007 | Lovett et al. | |
| 2010/0166995 A1 | 7/2010 | Sato | |
| 2012/0146266 A1* | 6/2012 | Oda | B29C 49/0005 264/512 |

\* cited by examiner

INTERNAL TUBE FOR TANKS, PARTICULARLY FUEL TANKS OF AUTOMOBILES

RELATED APPLICATIONS

The present patent document claims the benefit of and priority to European Patent Application 17167129.0, filed Apr. 19, 2017, and entitled "Internal Tube For Tanks, Particularly Fuel Tanks Of Automobiles" the entire contents of which are incorporated herein by reference.

FIELD

The present disclosure related to an internal tube for tanks, particularly fuel tanks of automobiles, wherein the tube has a fluid channel and a tube wall that encloses the fluid channel.

BACKGROUND

Internal tubes of the type mentioned at the outset for tanks as well as internal tubes for fuel tanks of automobiles are already known from practice in various designs. It is also already known to embody these internal tubes for tanks in a multilayer design. However, we have found that the internal tubes for tanks known from practice oftentimes have the drawback that components are washed out of the walls of the internal tube for tanks as a result of contact with fluids, for example with fuel. This can occur as a result of the fluid flowing in the tube on the one hand and as a result of the fluid that is located within the tank and comes in contact with the internal tube for tanks on the other hand. These washouts impair the functionality of the fuel system in a disadvantageous manner and can lead to damage and/or failure over the long term. In addition, the internal tubes for tanks that are known from practice often have elaborate constructions and are therefore costly to manufacture. Furthermore, we have found that the durability of the known internal tubes for tanks in the presence of mechanical and chemical loads often leaves something to be desired.

BRIEF SUMMARY

The present disclosure provides an internal tube of the type mentioned at the outset for tanks, in which the drawbacks described above can be avoided in an effective and functionally reliable manner, particularly in which undesired washouts from the tube walls can be prevented and which is also sufficiently durable in the presence of mechanical and chemical loads. Furthermore, the present disclosure is based on the technical problem of providing a tank with at least one such internal tube for tanks. To solve the technical problem, the present disclosure teaches an internal tube for tanks, particularly fuel tanks of automobiles, wherein the tube has a fluid channel and a tube wall that encloses the fluid channel, wherein the tube wall has a multilayer design and is composed of at least three layers, with one inner layer based on at least one polyolefin, preferably polyethylene, being provided, with at least one central layer based on at least one polyamide, preferably at least one aliphatic or semi-aliphatic polyamide, being present, and with an outer layer based on at least one polyolefin, preferably polyethylene, being provided.

In the context of the invention, "fluid" means particularly a fuel, preferably gasoline or diesel fuel. It lies within the scope of the invention for the fuel to contain admixtures and/or additives such as methanol and/or ethanol, for example. For the sake of simplification, the term "tube" is also used in part below instead of the term "internal tube for tanks."

According to a preferred embodiment, the internal tube for tanks has only the three layers inner layer, central layer, and outer layer. Another recommended design variant is characterized in that at least one adhesion promoter layer is arranged between the inner layer and the central layer and/or between the outer layer and the central layer. This adhesion promoter layer improves the adhesion between the inner layer and the central layer and/or between the outer layer and the central layer. In principle, it also lies within the scope of the invention for a barrier layer to be provided between the inner layer and the outer layer, which barrier layer prevents the permeation of one or more components of a fluid that is flowing through the internal tube for tanks through the tube walls toward the outside and thus has a barrier or blocking effect, as it were. In principle, such a barrier layer can also prevent the permeation of one or more components of a fluid surrounding the tube inward through the tube walls.

According to a preferred embodiment that holds special significance in the context of the present disclosure, the inner layer is electrically conductive. For this purpose, it is recommended that the inner layer contain suitable conductivity additives, such as carbon black, for example. It also lies within the scope of the present disclosure for the inner layer to contain additional additives such as stabilization additives and the like.

According to an exemplary embodiment, the inner layer is polyethylene-based. The inner layer is especially preferably made on the basis of high-density polyethylene (HDPE). It is recommended that at least one Ziegler-type catalyst or at least one metallocene catalyst be used for the manufacture of the high-density polyethylene. According to an especially recommended embodiment of the present disclosure, the inner layer is composed of at least 80 wt %, preferably at least 85 wt %, more preferably at least 90 wt % of at least one polyolefin, particularly polyethylene, especially preferably HDPE. It has proven to be especially expedient in the context of the present disclosure for the inner layer to be composed of at least 95 wt % and preferably at least 97 wt % of at least one polyolefin, particularly polyethylene, especially preferably HDPE. It also lies within the scope of the present disclosure for mixtures of polyolefins to be used. It is recommended that the layer thickness of the inner layer be 0.01 to 0.4 mm, preferably 0.03 to 0.3 mm, and especially preferably 0.05 to 0.25 mm.

One recommended embodiment of the present disclosure is characterized in that the inner layer is in direct contact with a fluid that is conducted in the fluid channel.

According to an exemplary embodiment, the at least one central layer is made on the basis of at least one aliphatic and/or semi-aliphatic polyamide. It is recommended that the at least one central layer be made on the basis of at least one polyamide from the group "polyamide 6, polyamide 6.6, polyamide 12, polyamide 612, polyphthalamide" and preferably on the basis of polyamide 6. It is recommended that the at least one central layer be composed of at least 80 wt %, preferably at least 85 wt %, more preferably at least 90 wt % of at least one polyamide, preferably polyamide 6. According to an embodiment that has proven to be very expedient, the at least one central layer is composed of at least 95 wt %, preferably at least 97 wt % of at least one polyamide, preferably polyamide 6. It lies within the scope of the present disclosure for mixtures of polyamides to be used. According to a preferred embodiment, the at least one central layer is made on the basis of a mixture of at least one aliphatic polyamide and at least one semi-aromatic polyamide or polyphthalamide. An alternative embodiment of the present disclosure is characterized in that the at least one central layer is made on the basis of at least one copolymer. Preferably, the at least one copolymer is made on the basis of at least one aliphatic polyamide with at least one semi-aromatic polyamide or polyphthalamide. It is recommended that the layer thickness of the at least one central layer be 0.01 to 2.5 mm, preferably 0.03 to 1.5 mm, and especially preferably 0.05 to 1.0 mm.

One exemplary embodiment that has special significance in the context of the present disclosure is characterized in that the outer layer is polyethylene-based. The outer layer is especially preferably made on the basis of high-density polyethylene (HDPE). It lies within the scope of the present disclosure for least one Ziegler-type catalyst or at least one metallocene catalyst to be used for the manufacture of the HDPE. It is recommended that the outer layer be composed of at least 80 wt %, preferably at least 85 wt %, more preferably at least 90 wt % of at least one polyolefin, particularly polyethylene, especially preferably HDPE. According to an embodiment that has proven to be very expedient, the outer layer is composed of at least 95 wt %, preferably at least 97 wt % of at least one polyolefin, particularly polyethylene, especially preferably HDPE. In principle, it also lies within the scope of the present disclosure for mixtures of various polyolefins to be used. It is recommended that the layer thickness of the outer layer be 0.01 to 0.4 mm, preferably 0.03 to 0.3 mm, and especially preferably 0.05 to 0.25 mm.

Another design variant is characterized in that the outer layer is in direct contact with a fluid located in the tank, particularly a fuel located in the tank.

According to an especially preferred embodiment, the outer layer is electrically conductive. For this purpose, the outer layer contains suitable conductivity additives, such as carbon black, for example. One very recommended embodiment that has special significance in the context of the present disclosure is characterized in that both the inner layer and the outer layer are electrically conductive. It also lies within the scope of the present disclosure for the central layer to be set up so as to be electrically conductive, expediently through the addition of conductivity additives. In principle, the outer layer and/or the central layer can also have additional additives such as stabilizing additives and the like. One embodiment of the internal tube according to the present disclosure for tanks is characterized in that all of the layers of the tube wall are electrically conductive— expediently through appropriate additives.

According to a recommended embodiment of the present disclosure, the inner layer contains no oligomers or substantially no oligomers—that is, the inner layer is preferably oligomer-free or substantially oligomer-free. It is recommended that the outer layer contain no oligomers or substantially no oligomers. The outer layer is thus preferably set up to be oligomer-free or substantially oligomer-free. It is recommended that both the outer and the inner layer contain no oligomers or substantially no oligomers. It also lies within the scope of the present disclosure, however, for the central layer to contain no oligomers or substantially no oligomers. Preferably, all of the layers of the tube wall are free of oligomers or substantially free of oligomers.

One preferred embodiment is characterized in that the inner layer and the outer layer are composed of the same material or substantially the same material. Preferably, both the inner layer and the outer layer are made on the basis of polyethylene, especially preferably on the basis of high-density polyethylene.

One recommended embodiment of the present disclosure is characterized in that the inner layer and/or the outer layer and/or the central layer has a greater layer thickness than the at least one adhesion promoter layer. Preferably, the inner layer and the outer layer have the same layer thickness or substantially the same layer thickness.

It lies within the scope of the present disclosure for the inner layer and/or the outer layer to have a lesser layer thickness than the at least one central layer. Preferably, the central layer is embodied as the layer with the greatest layer thickness of the tube wall of the internal tube for tanks. It is recommended that the total thickness (d) of the tube wall be 0.1 to 3.0 mm, preferably 0.2 to 2.5 mm, especially preferably 0.3 to 2.0 mm.

It lies within the scope of the present disclosure for the tube to have exactly five layers and, particularly, for a three-layer aggregate of the central layer and two adhesion promoter layers surrounding the central layer to be arranged between the inner layer and the outer layer.

It is recommended that the internal tube for tanks be produced through coextrusion of the layers.

According to a very recommended embodiment of the present disclosure, the tube is connected to a pump that is particularly arranged in the fuel tank of the automobile. The pump is used to convey the fluid medium located in the tank, more particularly the fuel present in the fuel tank, through the tube. However, the internal tube according to the present disclosure for tanks can also serve to equalize the pressure and/or to equalize the level between different areas of the tank or fuel tank. In any case, the internal tube for tanks is arranged on the interior or in the interior space of a tank or fuel tank.

According to an exemplary embodiment that holds special significance in the context of the present disclosure, the internal tube for tanks is embodied at least in some areas, preferably completely, as a corrugated tube. In the context of the present disclosure, "corrugated tube" means that the tube and/or the tube wall has wave crests and wave troughs that run around the circumference of the tube. Recommendably, these wave crests and wave troughs of the tube have the same or substantially the same spacing from one another over at least a portion of the length of the tube, preferably over the entire length or substantially over the entire length of the tube.

An alternative embodiment is characterized in that the tube, more particularly the outer surface of the tube, is smooth or substantially smooth at least in some areas, preferably in its entirety.

The object of the present disclosure is also a tank, particularly a fuel tank for automobiles, with at least one internal tube according to the present disclosure for tanks on the interior of the tank or fuel tank. Preferably, the internal tube for tanks is arranged at least in some areas on a wall of the tank or fuel tank. It is recommended for the internal tube for tanks to be fixed on a wall of the tank at least in some areas. In principle, however, it also lies within the scope of the present disclosure for the internal tube for tanks to be arranged in other areas of the interior of the tank and/or to run through other areas of the tank or fuel tank.

The present disclosure is based on the insight that the internal tube according to the present disclosure for tanks is characterized by a high level of resistance to mechanical and chemical influences and by the fact that, in particular, washouts from the walls of the internal tube for tanks can be prevented almost completely. This applies both to washouts as a result of a fluid, particularly fuel, flowing through the tube and to a fluid surrounding the internal tube for tanks. In particular, if the internal tube for tanks is arranged within a fuel tank of an automobile and is in direct contact with the fuel, nearly no washouts of plastic components from the walls of the internal tube for tanks occur. Moreover, it should be noted that the internal tube according to the present disclosure for tanks is simple and inexpensive to manufacture. Moreover, it is especially advantageous in the internal tube according to the present disclosure for tanks that it can be used for different types of fuel, for example for gasoline or diesel fuel, without impairing the advantageous characteristics described above. What is more, the internal tube according to the present disclosure for tanks can be used in a broad temperature range from −40 to 80° C. and is characterized by outstanding temperature resistance.

BRIEF DESCRIPTION OF THE DRAWINGS

The present disclosure is explained in further detail below with reference to a schematic drawing, which illustrates only one exemplary embodiment.

DETAILED DESCRIPTION

Figure 1:
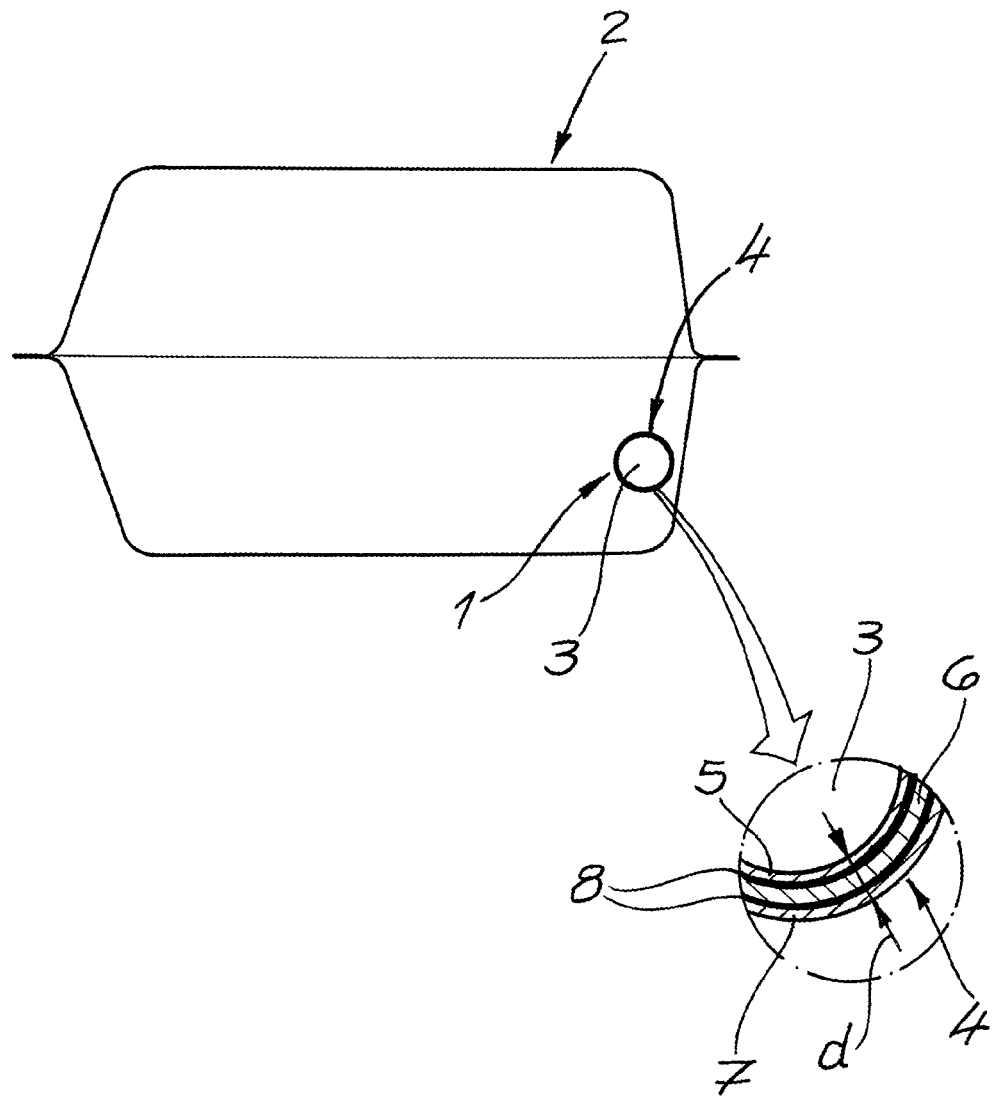
FIG. 1 shows a section through a fuel tank of an automobile with an internal tube according to the present disclosure for tanks.
Figure 2:
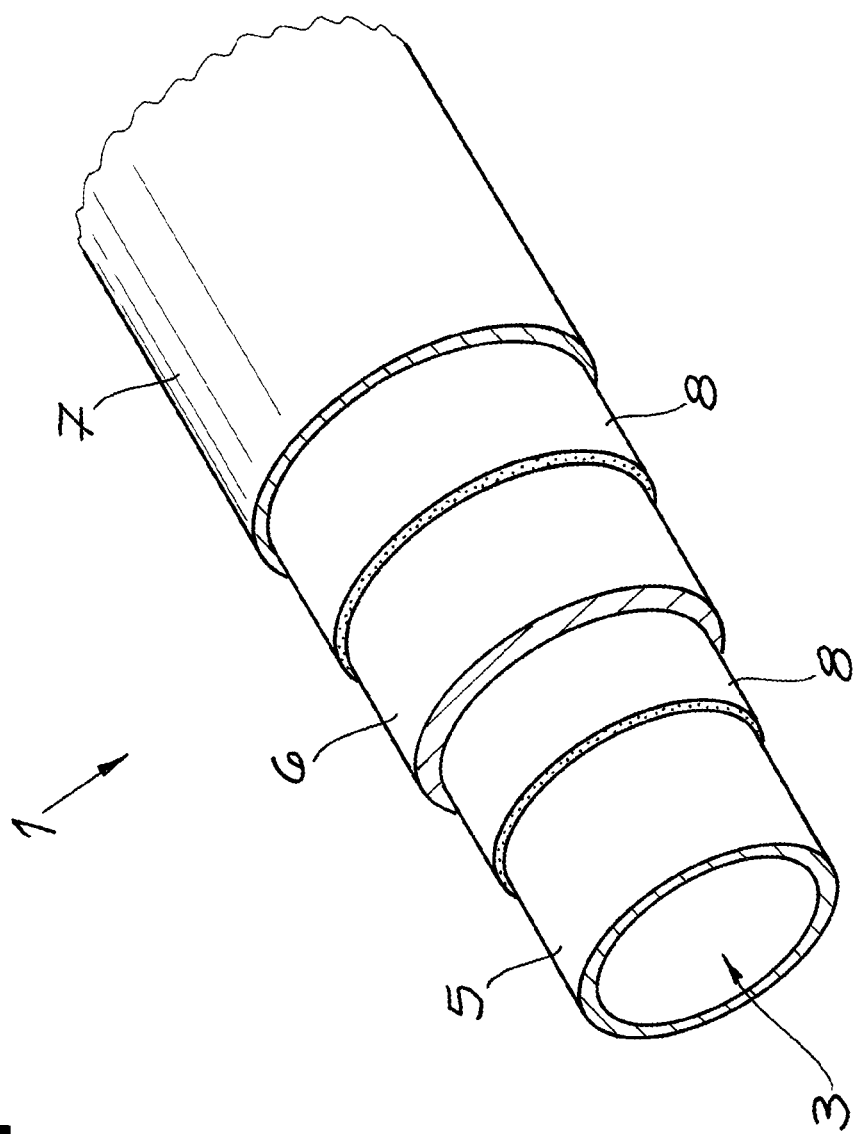
FIG. 2 shows a perspective view of the internal tube according to the present disclosure for tanks.

The figures show an internal tube 1 according to the present disclosure for tanks, which, like in the exemplary embodiment, is preferably arranged in a fuel tank 2 of an automobile. In principle, different types of fuel such as gasoline or diesel fuel can be present in the fuel tank 2 in which the internal tube 1 according to the present disclosure for tanks is arranged. The internal tube 1 for tanks has a fluid channel 3 and a tube wall 4 that surrounds the fluid channel 3. Preferably, and in the exemplary embodiment, the tube wall 4 surrounding the fluid channel 3 has five layers. Preferably, and in the exemplary embodiment, the inner layer 5 is made on the basis of high-density polyethylene (HDPE). Moreover, the inner layer 5 can have additives such as conductivity additives, stabilizing additives, or the like. Expediently, and in the exemplary embodiment, the inner layer 5 is followed by an adhesion promoter layer that improves the adhesion between the inner layer 5 and the layer following it. In the exemplary embodiment, a central layer is joined directly with the adhesion promoter layer 8, which central layer is preferably made on the basis of at least one aliphatic and/or semi-aliphatic polyamide, especially preferably, and in the exemplary embodiment, on the basis of polyamide 6. In addition, the central layer 6 can have additives such as conductivity additives, stabilizing additives, or the like. Recommendably, and in the exemplary embodiment, the inner layer 6 is followed immediately by an adhesion promoter layer 8 that improves the adhesion between the central layer 6 and the layer following it. Expediently, and in the exemplary embodiment, this adhesion promoter layer 8 is followed by the outer layer 7. Preferably, and in the exemplary embodiment, the outer layer 7 is made on the basis of high-density polyethylene (HDPE). In addition, the outer layer 7 can also have additives such as conductivity additives, stabilization additives, and the like.

Preferably, and in the exemplary embodiment, both the inner layer 5 and the central layer 6 and the outer layer 7 are electrically conductive. For this purpose, the layers have suitable conductivity additives such as carbon black or the like.

Expediently, and in the exemplary embodiment, the total thickness (d) of the tube wall is 0.2 to 2.5 mm. According to a recommended embodiment, and in the exemplary embodiment, the inner layer 5 and the outer layer 7 have a lesser layer thickness than the central layer 6. In the exemplary embodiment, the central layer 6 is therefore the layer with the greatest layer thickness.

According to a preferred embodiment, and in the exemplary embodiment, all of the layers of the internal tube 1 for tanks or of the tube wall 4 contain no oligomers or substantially no oligomers. The internal tube for tanks is therefore preferably oligomer-free or substantially oligomer-free, as it were.

The invention claimed is:

1. An internal tube for tanks, wherein the tube has a fluid channel and a tube wall that encloses the fluid channel, wherein the tube wall has a multilayer design and is composed of at least three layers, including an inner layer formed from at least one polyolefin, at least one central layer formed from at least one polyamide, and an outer layer formed from at least one polyolefin;
   wherein the inner layer and the outer layer have a smaller layer thickness than the at least one central layer.

2. The internal tube for tanks as set forth in claim 1, wherein first and second adhesion promoter layers are arranged between the inner layer and the central layer, and between the outer layer and the central layer, respectively.

3. The internal tube for tanks as set forth in claim 1, wherein the inner layer is electrically conductive.

4. The internal tube for tanks as set forth in claim 1, wherein the inner layer is formed from high-density polyethylene (HDPE).

5. The internal tube for tanks as set forth in claim 1, wherein the layer thickness of the inner layer is 0.01 to 0.4 mm.

6. The internal tube for tanks as set forth claim 1, wherein the inner layer is composed of at least 80 wt % of at least one polyolefin.

7. The internal tube for tanks as set forth in claim 1, wherein the inner layer is in direct contact with a fluid that is conducted in the fluid channel.

8. The internal tube for tanks as set forth in claim 1, wherein the at least one central layer is made on the basis of at least one polyamide from the group "polyamide 6, polyamide 6.6, polyamide 12, polyamide 612, polyphthalamide".

9. The internal tube for tanks as set forth in claim 1, wherein the layer thickness of the at least one central layer is 0.01 to 2.5 mm.

10. The internal tube for tanks as set forth in claim 1, wherein the central layer is composed of at least 80 wt % of at least one polyamide.

11. The internal tube for tanks as set forth in claim 1, wherein the at least one central layer is made on the basis of a mixture of at least one aliphatic polyamide and at least one partially aromatic polyamide or polyphthalamide.

12. The internal tube for tanks as set forth in claim 1, wherein the at least one central layer is made on the basis of at least one copolymer, with the copolymer being made on the basis of at least one aliphatic polyamide with at least one partially aromatic polyamide or polyphthalamide.

13. The internal tube for tanks as set forth in claim 1, wherein the outer layer is made on the basis of high-density polyethylene (HDPE).

14. The internal tube for tanks as set forth in claim 1, wherein the layer thickness of the outer layer is 0.01 to 0.4 mm.

15. The internal tube for tanks as set forth in claim 1, wherein the outer layer is composed of at least 80 wt % of at least one polyolefin.

16. The internal tube for tanks as set forth in claim 1, wherein the outer layer is in direct contact with a fluid that is located in the tank.

17. The internal tube for tanks as set forth in claim 1, wherein the inner layer and the outer layer are made on the basis of a mixture of polyolefins.

18. The internal tube for tanks as set forth in claim 1, wherein the total thickness (d) of the tube wall is 0.1 to 3.0 mm.

19. The internal tube for tanks as set forth in claim 1, wherein the tube is at least partially formed as a corrugated tube.

20. A fuel tank for automobiles, with at least one internal tube for tanks as set forth in claim 1, positioned on the interior of the tank.

21. An internal tube for tanks as in claim 1, wherein the inner layer is formed of polyethylene.

22. An internal tube for tanks as in claim 1, wherein the at least one central layer is formed of one of aliphatic polyamide and partially aliphatic polyamide.

23. An internal tube for tanks as in claim 1, wherein the outer layer is formed of polyethylene.

24. An internal tube for tanks as in claim 16, wherein the tank is a fuel tank and the fluid is a fuel located within the tank.

* * * * *